UNITED STATES PATENT OFFICE.

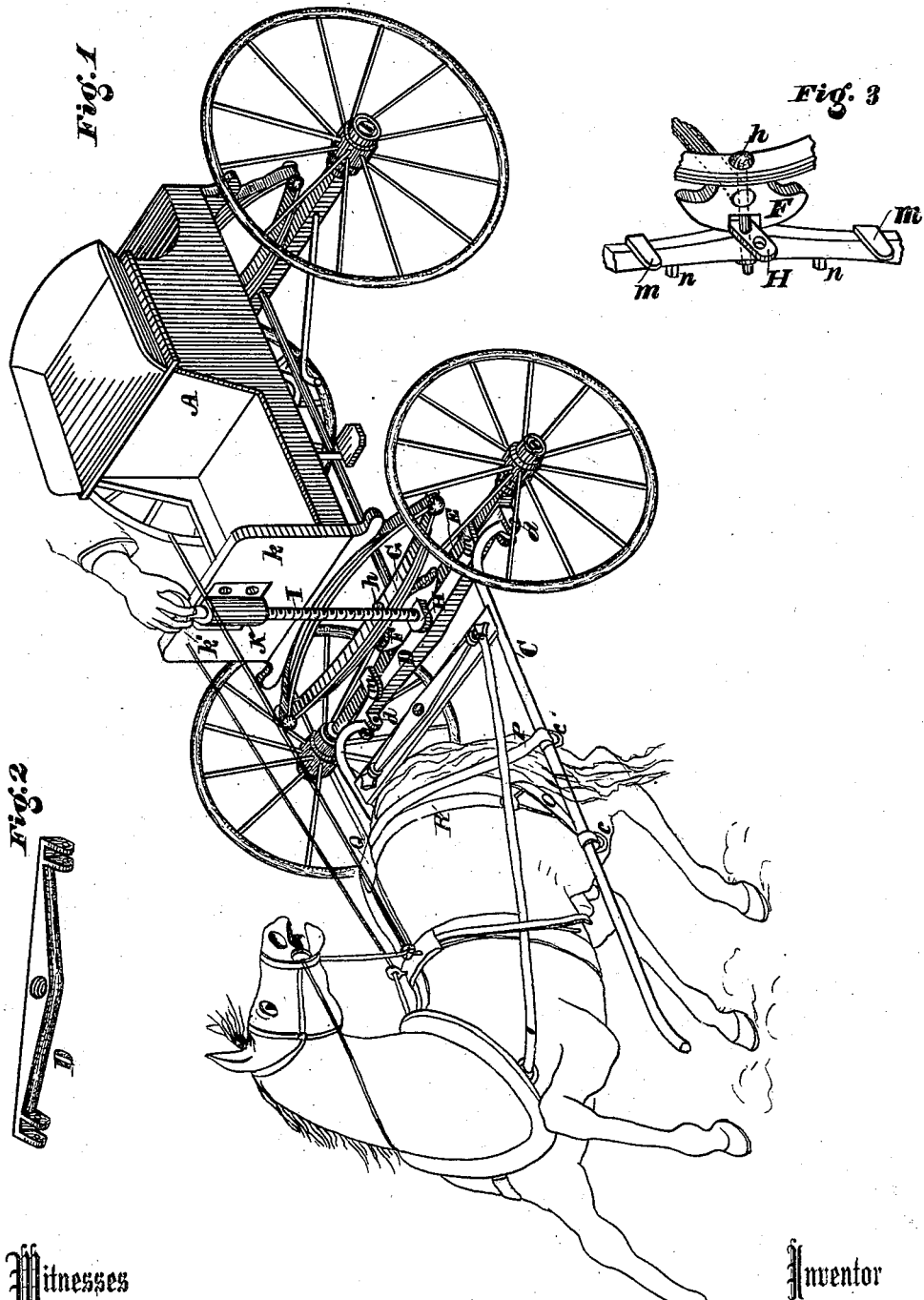

LOUISA F. SLEEPER, OF PHILADELPHIA, PENNSYLVANIA, ASSIGNOR OF ONE-HALF HER RIGHT TO CHARLES B. RITTER, OF SAME PLACE.

IMPROVEMENT IN DETACHING HORSES.

Specification forming part of Letters Patent No. 188,426, dated March 13, 1877; application filed November 27, 1876.

*To all whom it may concern:*

Be it known that I, LOUISA F. SLEEPER, of Philadelphia, in the county of Philadelphia and State of Pennsylvania, have invented a certain new and useful Apparatus for Detaching Horses from Vehicles; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of my invention. Figs. 2 and 3 are detail perspectives.

My invention has for its object to provide means for readily detaching a runaway horse from the vehicle to which he is hitched, so as to avoid injury or accident to said vehicle, or the occupants thereof.

The nature of my invention consists, first, in connecting the shafts to the axle-tree by means of a screw-rod secured to the dash-board or equivalent part of the vehicle, in such manner that it shall be within easy reach of the occupant of said vehicle, so that when the horse "runs off" the shafts may be disconnected from the axle-tree by unscrewing said rod; secondly, in certain details of construction hereinafter more fully set forth.

Referring to the accompanying drawing, A designates a buggy or other vehicle, of the usual or any suitable construction; and B, a fiery steed hitched thereto. The shafts of the vehicle are shown at C, terminating in a cross-bar, D, secured to said shafts by bolts $d$ $d$, forming a pivotal connection. E is the front axle of the vehicle, and F the bolster, on which rests the spring G. H is a bar or plate, pivoted by means of the bolt $h$, which passes through said spring between the bolster and axle. I is a threaded rod, held in a vertical position in the nut K, which is secured to the dash-board $k$ of the vehicle, said rod terminating in a hand-wheel, $k'$. Said rod passes through the nut K, bar H, and cross-bar D, the passages in the nut and bar being threaded, while that in the plate is smooth. $m$ $m$ show two horizontal lugs, secured to the axle E, and designed to prevent the cross-bar D from rising above said axle, and $n$ $n$ are two vertical hangers on said axle, the object of which is to prevent said cross-bar D from getting beneath the axle, as also to avoid bending the rod I when the spring G " gives " under the weight of the occupants or the jolting of the vehicle. $c$ $c$ show the staples through which the customary breech-band straps O pass, and $c'$ are similar devices, located some distance in the rear of said breech-band staples, to form means for securely connecting straps P P to the shafts C. Said straps P P proceed downwardly from the back-strap Q in the rear of the hip-straps R R, and are passed through the staples $c'$, and fastened in the manner in which breech-band straps usually are—namely, by buckling. They should be secured to the back-strap in any appropriate manner, as by stitching to a ring.

The operation is obvious. When the steed runs away, the occupant of the vehicle merely turns the rod I, unscrewing the same from the cross-bar D, thus permitting the shafts to be carried off, while the vehicle comes to a state of rest. The shafts, though detached, do not fall down upon the horse's heels, being prevented from doing so by the straps P P.

The object of the plate H is not only to form a means of connection between the axle E and cross-bar D, but also to permit said axle to readily swing around in turning the vehicle without bending the rod I out of place. The center of motion of said axle being the bolt $h$, it is obvious that if said plate were not pivoted, the movement of the axle would bend the rod I and render the apparatus impracticable and inoperative.

I have described and shown certain means for preventing the dropping of the shafts when the latter are separated from the vehicle; but as I am about to make these the subject of a separate application, I disclaim them here.

What I claim as my invention is—

1. The screw-rod I, secured by means of a nut, K, on the front of a vehicle, and serving to connect the shafts to the axle-tree through the medium of the cross-bar D and pivoted plate H, substantially as shown and described.

2. In combination with the pivoted cross-bar D, axle E, and screw-rod I, the pivoted plate H, substantially as and for the purposes set forth.

3. The lugs m m, secured to the axle E, for the purpose specified.

In testimony that I claim the foregoing I have hereunto set my hand this 13th day of November, 1876.

MRS. LOUISA F. SLEEPER.

Witnesses:
 M. DANL. CONNOLLY,
 CHAS. F. VAN HORN.